Patented July 30, 1946

2,405,008

UNITED STATES PATENT OFFICE 2,405,008

TREATMENT OF ORIENTED HALOGEN-CONTAINING POLYMERS

Kenneth Lester Berry, Hockessin, and Julian Werner Hill, Wilmington, Del., assignors to E. I. du Pont de Nemours & Company, Wilmington, Del., a corporation of Delaware No Drawing. Application September 21, 1943, Serial No. 503,236

12 Claims. (Cl. 8—115.5)

This invention relates to oriented synthetic fibers, films, foils, tapes, tubes, etc., prepared from halogen-containing polymers of vinyl and vinylidene compounds.

It is known that halogen-containing vinyl and vinylidene polymers can be made into filaments, films, foils, tapes, tubes, etc., which may be oriented by stretching to give strong, flexible fibers. In general, fibers, films, foils, tapes, and tubes thus prepared from most of these polymers would be commercially attractive because of relatively low cost and resistance to chemicals and combustion were it not for the fact that they shrink or retract excessively when exposed to the only moderately high temperatures encountered in all but a few specialized uses. It is not unusual to have oriented fibers, films, foils, tapes, tubes, etc., of halogen-containing vinyl polymers start to shrink at about 70° C. and to shrink as much as 60–80% in boiling water. The disadvantages attendant with the general use of such fibers in textiles are many. Articles prepared from them cannot be placed in the usual 100° C. dye bath, laundered in hot water, used to filter hot fluids, or ironed without shrinking them to such an extent that they are no longer useful. Several methods of reducing the heat shrinkage of these fibers have heretofore been tried, but the results have not been entirely satisfactory. Thus threads have been heated under tension to approximately their softening point but no increase in softening point nor in resistance to organic solvents was obtained and the shrinkage was severe at temperatures approaching the softening point. The same is true for foils, tapes, tubes, films, etc.

This invention has as an object the reduction of the heat shrinkage of halogen-containing vinyl polymer filaments. Another object is the elevation of the normally low softening points of such polymers. A further object is an increased resistance to chemicals. A still further object is a decrease in the thermoplasticity of oriented shaped objects. Another object is an increased tensile strength of these objects at elevated temperatures. Other objects will appear hereinafter.

These objects are accomplished by the following invention wherein an oriented shaped object, i. e. a fiber, film, tape, foil, or tube of a halogen-containing linear polymer of a monoethylenic vinyl or vinylidene compound having the halogen attached to intralinear carbon is cured, while maintained under sufficient tension to prevent any substantial retraction thereof, by heating, in the presence of a curing agent for the polymer, at 135–150° C. until the polymer is insoluble (room temperature) in solvents for the untreated polymer. With polymers which before treatment soften below 135–150° C., the fiber or other shaped object is heated under tension at a temperature close to but below the softening point of the polymer, and the treating temperature is raised, but always below the then softening point of the polymer to 135–150° C. and maintained at that temperature for at least 15 minutes or until the polymer is insoluble in solvents for the untreated polymer.

The halogen-containing vinyl or vinylidene polymer is melt, dry, or wet spun into filaments. In melt spinning the polymer is heated to the softening point and sufficient pressure is applied to force the fluid material through small openings in a spinneret. The extruded polymer is in the form of filaments which are cooled and mechanically wound on a bobbin which may be operated at various speeds. Those polymers which cannot be readily melt spun because of an excessive rate of decomposition at the temperature where they are sufficiently fluid to permit extrusion are preferably dry or wet spun. In dry spinning the polymer is dissolved or dispersed in a suitable solvent which is forced through a filament-forming spinneret into a heated gas zone where the solvent evaporates leaving solid filaments of the polymer. Wet spinning is similar except that the solution, instead of being spun into a chamber of gas, is extruded into a liquid which is a non-solvent for the polymer but dissolves the solvent used for preparation of the spinning solution. The liquid filaments are thereby solidified and may be wound on a bobbin.

Following the spinning operation, the filaments may or may not be twisted together before the thread is drawn or stretched to produce molecular orientation along the longitudinal axis of the fiber. The drawing can be done by unwinding the filaments from the spinning bobbin, passing them through an inert fluid held at a suitable temperature usually higher than room temperature and winding them on a second bobbin operating at a greater peripheral speed than the first bobbin. This stretching operation is a vital feature in the production of useful textile fibers from the vinyl resins because it serves the dual purpose of increasing the tensile strength, and of conferring on the fibers the property of true elasticity. By means of the stretching operation the two important properties of tenacity and elongation may be controlled and varied almost at will.

The heat shrinkage of the oriented fibers is decreased by aftertreatments and the present invention is particularly concerned with the reduction of the heat shinkage of oriented fibers prepared in any of the aforementioned ways from halogen-containing linear polymers of monoethlylenic vinyl and vinylidene compounds. It is known that such polymers, even those having completely saturated molecular chains, can be vulcanized by special procedures developed for these substances. This process has not heretofore been applied to oriented fibers of the materials because there was no known method of effecting the cure in order to obtain the valuable improvements in properties described hereinafter while retaining the desirable characteristics achieved by orientation of the fibers. This invention provides a method for applying the process of vulcanization to oriented fibers of halogen-containing linear vinyl and vinylidene polymers in order to obtain strong, resilient, and elastic fibers, which still show molecular orientation by X-ray diffraction and which have improved stability to heat and solvents.

The preferred mode of operation of this invention is as follows: to the solution or dispersion of the polymer intended for wet or dry spinning at least 1 part of curing agent or agents for each 100 parts of polymer in the solution is added. After the polymer is spun and drawn in the usual manner of preparing oriented fibers, the latter are wound on a bobbin so they cannot retract to any substantial extent, and they are then heat treated. The heat treatment is preferably performed in a high boiling liquid which has no solvent or swelling action on the fibers. Kerosene, mineral oil, or glycerol can usually be employed. The bobbin-wound fibers containing the curing agents are placed in the heating medium while it is at a temperature below which the fibers would break, as determined by a pilot test, and the temperature of the fluid is slowly increased at approximately the same rate or a rate slower than that at which the temperature of zero tenactiy of the fibers is increased. This rate of heating is readily determined by trial on a small sample of the fiber. It is essential that the rate of elevation of the curing temperature does not exceed the rate of increase of the softening point of the polymer, i. e. the temperature of zero tensile strength since otherwise the tensioned fibers break. The curing temperature must be raised to 135–150° C. to effect curing in the shortest possible time. In the case of fibers, etc., initially having a softening point above 150° C., the treatment can be carried out by heating at 135–150° C. without the preliminary gradual increase in the treating temperature.

The curing agent cannot be incorporated beforehand in those polymers intended for melt spinning because the heating involved brings about the curing of the polymer, resulting in a composition which is not melt spinnable. The process of this invention is preferably applied to melt spun and oriented halogen-containing vinyl or vinylidene resin fibers as follows: the oriented fibers prepared in the usual manner are heat treated as before in the high boiling fluid to which has been added at least one part of the curing agent for each 100 parts of the heat transfer liquid. The agent and heating medium are so chosen that the former is soluble in the liquid at least at temperatures of 100° C. and above, and the fibers to be treated are not dissolved, swollen, or chemically attacked by the medium. This method described for the heat treatment of melt spun fibers in the presence of an agent which will cure these polymers may also be applied to wet or dry spun fibers regardless of whether or not any curing agent was previously added to the spinning solution.

The temperature of the heat treatment is gradually increased as previously described until a temperature of preferably 135–150° C. is reached. The treatment at this temperature is continued until the desired results are achieved. This usually requires between ¼ and 2 hours. At the expiration of the treatment the fibers are rinsed if necessary, and they are then ready for further textile processing or use.

The more detailed practice of the invention is illustrated by the following examples, wherein parts given are by weight. There are, of course, many forms of the invention other than these specific embodiments.

*Example I*

A mixture of 50 parts of a copolymer of 95 parts vinyl chloride with 5 parts of diethyl fumarate and 1 part each of magnesium oxide and a condensation product of butyraldehyde and aniline sold commercially as "Accelerator 808" is milled until homogeneous on standard rubber mill rolls at a temperature of 80–100° C. Ten parts of this mixture is placed in 50 parts of cyclohexanone which is maintained at 100° C. and stirred until a uniform, viscous dispersion results. This dispersion is cooled to room temperature and spun in the manner of wet spinning into a coagulating bath comprising 5 parts of water in one part of methanol. The filaments formed therein are wound on glass bobbins and soaked overnight in water at room temperature. The filaments are stretched to eight times their original length in boiling water and cooled while held at constant length. That orientation of the structural units in the fibers results from the stretching process is revealed by their X-ray diffraction pattern. The oriented fibers are heated at constant length for three hours at 100° C. followed by 1.5 hours at 125° C. and finally for 0.8 hour at 150° C. Following the heat treatment at each of the various temperatures, the temperature of zero tensile strength of the fiber is determined on a small sample in order to ascertain what temperature can be tolerated in the succeeding heat treatment. The treated fiber shrinks only 15% during 5 minutes' immersion in boiling water, whereas the fiber before curing shrinks 48%. Attempts to similarly heat treat fibers prepared in the absence of the amine-aldehyde condensation product and magnesium oxide are unsuccessful in that they break when a temperature of about 105° C. is surpassed.

*Example II*

A mixture comprising 2.5 parts of the copolymer of Example I, 0.025 part of phenoxypropylene oxide stabilizer, 0.050 part of magnesium oxide and 0.075 part of "Accelerator 808" is stirred in 11.4 parts of cyclohexanone at 100° C. until a uniform, viscous dispersion results. This is wet spun at room temperature into a methanol coagulating bath. The resulting filaments are washed in water and drawn at a ratio of 8.5 in boiling water. The fibers at this stage are oriented, have a tenacity of 2.1 g./d. (grams per denier) at 21% elongation, shrink 58% in boiling water, stick to a metal block at 110% C., lose all strength at about 105° C., and dissolve in cyclohexanone at ordinary temperatures. The oriented fibers are held at constant length and heat treated in air, the temperature being raised to 105–110° C. over about 10–15 minutes and maintained at that temperature for 20–15 minutes. The temperature of heat treatment is then slowly raised to 145° C. taking the precautions indicated in Example I. Heating at 145° C. is continued for 0.5 hour. The treated, oriented fibers have a tenacity of 1.7 g./d. at 18% elongation, shrink only 17% in boiling water, stick to a metal block at temperatures above 153° C., retain structural strength above 150° C., and are only swelled by immersion in cyclohexanone at 100° C.

Samples of the unoriented filaments containing the curing agents, before stretching, are heat treated as before. The filaments can be stretched in boiling water to a ratio of about 6.0 but they shrink 60% in boiling water. This demonstrates the necessity for orienting the fibers by stretching before applying the process of this invention in order to obtain oriented fibers having reduced heat shrinkage.

Fibers of this copolymer are prepared in a manner similar to the above except that the curing agent is omitted from the composition. After orientation by stretching, they are heat treated at constant length for 2.5 hours at 100–105° C., the highest safe temperature of treatment. The heat treated fibers shrink 42% in boiling water, i. e., satisfactory results are not obtained in the absence of the curing agents.

Example III

Oriented fibers of polyvinylidene fluoride are prepared as follows: 7 parts of the polymer is dissolved in 28 parts of dimethylformamide and this solution is wet spun into water at room temperature. Orientation of the filaments is achieved by stretching to 4.3 times the original length in glycerol at 125° C. The fibers shrink 9.5% in boiling water, stick to a metal block at 170° C. and lose all tensile strength at 195° C. The fibers are treated at constant length for 0.5 hour in a solution of 5 parts "Accelerator 808" in 95 parts of mineral oil at 150° C. The treated fibers shrink 3.6% in boiling water, stick to a metal block at 190° C., have zero tenacity at above 250° C., and are only swelled in dimethylformamide at room temperature. Before heat treatment the fibers have a tenacity of 1.1 g./d. at 12.5% elongation, and after treatment the tenacity is 1.0 g./d. at 10.5% elongation.

Example IV

Oriented fibers of chlorinated polyvinyl chloride known as "Igelite PC" are held at constant length in a solution of 5 parts "Accelerator 808" in 95 parts of kerosene which is slowly brought, in the manner of Example I, to a temperature of 145–150° C. during a period of 0.5 hour and held at this temperature for a similar period. The treated fibers do not shrink in boiling water, have a softening temperature above 250° C. and are insoluble in cyclohexanone. The untreated, oriented fibers shrink 50% in boiling water, soften at about 85–90° C., and are soluble in cyclohexanone.

Example V

Oriented fibers of a copolymer of vinylidene chloride and vinyl chloride known as "Saran" are treated by the method of Example IV. They do not shrink in boiling water and soften above 250° C. Untreated, oriented fibers shrink about 9% in boiling water and soften at about 150° C.

Example VI

Samples of the untreated fibers of Example V are held at constant length for one hour in a solution of 1.5 parts of dicyclopentamethylenethiuram tetrasulfide, known commercially as "Tetrone A," in 98.5 parts of kerosene maintained at 135° C. The treated fibers shrink only 1% in boiling water and do not soften below 200° C. They are insoluble in cyclohexanone at 100° C. Untreated fibers shrink 9% in boiling water, soften at about 150° C., and dissolve completely in cyclohexanone at 100° C.

Application of the process of this invention is not limited to the polymers previously mentioned. It is applicable to any oriented halogen-containing polymer of a monoethylenic vinyl or vinylidene compound which polymer is capable of being oriented by stretching. Examples of orientable, halogen-containing vinyl polymers are: polyvinyl chloride, which is available commercially; polyvinyl bromide (described, for example, in J. Russ. Phys.-Chem. Soc., 44, 204 (1912), and J. Chem. Soc. 102, 280 (1912)); orientable polyvinyl fluoride, prepared by polymerizing vinyl fluoride in the presence of a small proportion of an organic peroxy compound at elevated temperature and pressure, as described in application Serial No. 510,966, filed Nov. 19, 1943; poly-1,1-fluorobromoethylene (Bull. Sic. Acad. Roy. Belg., 1909, 728); chlorinated polyethylene (U. S. Patent 2,183,556); and after-chlorinated polyvinyl chloride such as the product known as "Igelite PC," (Ger. Pat. 596,911). Some examples of vinyl halide copolymers are: vinyl chloride/diethyl fumarate polymers (U. S. Patent 1,945,307); vinyl chloride/vinyl ester polymers, known commercially as the "Vinylites"; vinyl fluoride/olefinic hydrocarbon polymers such as are described in application Serial No. 510,965, filed Nov. 19, 1943; and vinyl chloride/ethylene polymers (application Serial No. 383,556, filed March 15, 1941). Representative examples of vinylidene halide polymers and copolymers are: polyvinylidene chloride (U. S. Patent 2,160,903); polyvinylidene bromide (Jahresber, 1860, 431); orientable polyvinylidene fluoride, as described in application Serial No. 531,986, filed April 20, 1944; interpolymers of vinylidene fluoride with ethylene and holagenated ethylenes, described in application Serial No. 524,300, filed Feb. 28, 1944; vinylidene chloride/vinyl chloride copolymers, known commercially as "Saran"; vinylidene chloride/acrylonitrile polymers, described in application Serial No. 425,206, filed Dec. 31, 1941; copolymers of vinylidene chloride with unsaturated, polymerizable ketones described in application Serial No. 349,000, filed July 31, 1940; and the interpolymers of vinyl chloride described in U. S. Patent 2,278,415. In addition to fibers, the oriented shaped objects to which the process of the invention is applicable include films, foils, ribbons, tapes, tubes, etc., regardless of whether oriented by stretching or rolling.

The polymer may be modified with stabilizers such as phenoxypropylene oxide and stearylamine; plasticizers such as dibutyl phthalate, sulfur, and tricresyl phosphates; delusterants such as titanium dioxide; fillers and extenders such as clay and whiting; hydrogen halide acceptors such as metal oxides; reinforcing agents such as carbon black; pigments such as cadmium sulfide; etc.

The choice, amount, and manner of bringing the curing agent or agents into contact with the polymer may be widely varied and they may be employed singly or in combination in amounts ranging from 0.1–15% of the weight of the polymer. The preferred amounts are in the range 0.25–10%. The agent may be milled into the polymer, added to the spinning dope, added to the coagulating bath, incorporated by impregnation from solutions, or sprayed onto the polymer. Oriented polymer may be treated by the vapor of the more volatile substances.

Any curing agent for halogen-containing polymers of vinyl and vinylidene compounds may be used. Many such agents are known in the art. In addition to the curing agents above disclosed (other terms used in the art are vulcanizing agents, petronizing agents, insolubilizing agents), there may be employed the aliphatic aldehyde-aromatic amine products of U. S. Patent 2,117,591, e. g., the condensation product of butyraldehyde with aniline or of acetaldehyde with para-toluidine; the water-soluble sulfides, such as sodium sulfide or potassium sulfide, of U. S. Patent 2,070,443; the thiuram tetrasulfides, such as di-pentamethylenethiuram tetrasulfide, of U. S. Patent 2,274,616; the "petronizing" agents of U. S. Patent 2,148,831, among which are the ureas, e. g., urea itself and N-alkylureas; the thioureas, e. g., di-ortho-tolylthiourea; the dithiocarbamic acids, e. g., pentamethylenedithiocarbamic acid; the thiuram mono- and disulfides such as dimethylthiuram monosulfide or diethylthiuram disulfide; the mercaptothiazoles, e. g., mercaptobenzothiazole and zinc mercaptothiazole; the xanthates, e. g., zinc butyl xanthate; the guanidines, e. g., diphenylguanidine, the guanidine salt of di-methylamino dimethyldithiocarbamic acid, guanidine hydrochloride, etc. Inorganic materials such as zinc oxide, magnesia, zinc dust, sulfuric acid and sulfur may also be employed.

The heat treatment is also subject to some variation, both in regard to time and temperature of treatment. These factors are varied depending upon the nature of the polymer, the curing agent or agents, and the degree of vulcanization and amount of attendant shrinkage reduction desired. The initial temperature of treatment is always below that at which the rigidly held polymer would break. The fastest rate of temperature increase is determined by the rate of curing of the material. The upper temperature limit is set only by the thermal stability of the polymer or curing agent used but should be at least 15° C. above the original softening point, i. e., temperature of zero tenacity of the polymer.

The temperature of zero tenacity, which is indicative of the softening or melting point of the polymer, is determined by subjecting the oriented, shaped article to a very small stress in the direction of orientation and maintaining this stress while heating the object. Heating is continued until the temperature at which the article breaks is attained. This is the temperature of zero tenacity.

The term "substantial retraction" as used in this specification means a retraction greater than about 10%. Sufficient tension to prevent this is applied to the oriented, shaped article in the direction of the orientation, which is also the direction in which the article was stretched or rolled to produce the orientation. The amount of tension required is, of course, a function of the chemical nature of the polymer, the temperature, and the cross sectional area of the article.

Although the preferred mode of operation of this invention, involving heat treatment of the articles on bobbins, implies a batch process, it is entirely possible to operate the process continuously. This is accomplished by passing the article at the appropriate rate through successive heating zones, each one of which is maintained at a temperature higher than that of the preceding zone through which the article passed.

Oriented fibers of halogen-containing vinyl polymers treated by the process of this invention have low heat shrinkage, higher softening temperatures, higher solvent resistance, and decreased thermoplasticity. They are therefore of greater utility than heretofore for the manufacture of such things as wearing apparel, filter fabric, cordage, bristles, leaders, nets, screens, etc. Because of their resistance to combustion they are particularly useful for awnings, draperies, curtains, mattress covers, upholstery fabrics, decorative fabrics, tarpaulins, tents, working clothing, gloves, etc. Oriented films, foils, tapes, etc., are useful as moisture and flame-resistant wrapping film, containers, curtains, umbrellas, gaskets, electrical insulation, belting, capes, dish covers, raincoats, etc. Oriented tubing prepared from treated polymers can carry a wider variety of liquids than heretofore possible and is usable at higher temperatures.

The term "hetero atom" is used in the sense of Classification Bulletin 85, page 8 and Hilditch—Third Year Organic Chemistry, page 6 and together with the atomic weight limitation "less than 33" indicates oxygen, nitrogen or sulfur.

The above description and examples are intended to be illustrative only. Any modification of or variation therefrom which conforms to the spirit of the invention is intended to be included within the scope of the claims.

What is claimed is:

1. A process for reducing the heat shrinkage of a shaped object of an oriented, halogen-containing polymer of a monoethylenic unsaturated compound having the halogen attached to intralinear carbon which comprises heating said shaped object with from 0.1% to 15%, based on the weight of the polymer, of an organic curing agent having carbon attached by two bonds to a hetero atom of atomic weight less than 33, by at least one valence to nitrogen, said agent being selected from the class consisting of aliphatic aldehyde-aromatic amine condensation products, thiuram mono-, di-, and tetrasulfides, ureas, thioureas, dithiocarbamic acids and salts thereof, mercaptothiazoles, and guanidines, and under tension at a temperature of 135–150° C. after a gradual increase of the treating temperature which is kept close to but below the rising softening point of the polymer until the polymer is insoluble in solvents for the untreated polymer.

2. A process for reducing the heat shrinkage of a filament of an oriented, halogen-containing polymer of a monoethylenic unsaturated compound having the halogen attached to intralinear carbon which comprises heating said filament with from 0.1% to 15%, based on the weight of the polymer, of an organic curing agent having carbon attached by two bonds to a hetero atom of atomic weight less than 33, by at least one valence to nitrogen, said agent being selected from the class consisting of aliphatic aldehyde-aromatic amine condensation products, thiuram mono-, di-, and tetrasulfides, ureas, thioureas, dithiocarbamic acids and salts thereof, mercaptothiazoles, and guanidines, and under tension at a temperature of 135–150° C. after a gradual increase of the treating temperature which is kept close to but below the rising softening point of the polymer until the polymer is insoluble in solvents for the untreated polymer.

3. Process for reducing the heat shrinkage of an oriented halogen-containing vinyl polymer filament which comprises heating the same under tension and in contact with from 0.1 to 15%, based on the weight of the polymer, of an organic curing agent having carbon attached by two valences to a hetero atom of atomic weight less than 33, by at least one valence to nitrogen, said agent being selected from the class consisting of aliphatic aldehyde-aromatic amine condensation products, thiuram mono-, di-, and tetrasulfides, ureas, thioureas, dithiocarbamic acids and salts thereof, mercaptothiazoles, and guanidines at a progressively increasing temperature maintained below the progressively increasing softening point of the filament until the temperature reaches 135–150° C. which temperature is then maintained for at least fifteen minutes.

4. Process for reducing the heat shrinkage of an oriented vinyl chloride polymer filament which comprises heating the same under tension and in contact with from 0.1 to 15%, based on the weight of the polymer, of an organic curing agent having carbon attached by two valences to a hetero atom of atomic weight less than 33, by at least one valence to nitrogen, said agent being selected from the class consisting of aliphatic aldehyde-aromatic amine condensation products, thiuram mono-, di-, and tetrasulfides, ureas, thioureas, dithiocarbamic acids and salts thereof, mercaptothiazoles, and guanidines at a progressively increasing temperature maintained below the progressively increasing softening point of the filament until the temperature reaches 135–150° C. which temperature is then maintained for at least fifteen minutes.

5. Process for reducing the heat shrinkage of an oriented vinyl chloride polymer filament which comprises heating the same under tension and in contact with from 0.1 to 15%, based on the weight of the polymer, of an aliphatic aldehyde-aromatic-amine condensation product at a progressively increasing temperature maintained below the progressively increasing softening point of the filament until the temperature reaches 135–150° C. which temperature is then maintained for at least fifteen minutes.

6. Process for reducing the heat shrinkage of an oriented vinyl chloride polymer filament which comprises heating the same in contact with from 0.1 to 15%, based on the weight of the polymer, of a butyraldehyde-aniline condensation product at a progressively increasing temperature maintained below the progressively increasing softening point of the filament until the temperature reaches 135–150° C. which temperature is then maintained for at least fifteen minutes.

7. Process for reducing the heat shrinkage of a filament of an oriented halogen-containing polymer of a monoethylenic unsaturated compound which comprises heating said filament under tension in intimate association with from 0.1 to 15%, based on the weight of the polymer, of an aliphatic aldehyde-aromatic-amine condensation product at a progressively increasing temperature below the progressively increasing softening point of the polymer until 135–150° C. is reached and maintaining the filament under tension at that temperature until the filament is insoluble in solvents for the uncured polymer.

8. Process for reducing the heat shrinkage of a filament of an oriented halogen-containing polymer of a monoethylenic unsaturated compound which comprises heating said filament under tension in intimate association with from 0.1 to 15%, based on the weight of the polymer, of a butyraldehyde-aniline condensation product at a progressively increasing temperature below the progressively increasing softening point of the polymer until 135–150° C. is reached and maintaining the filament under tension at that temperature until the filament is insoluble in solvents for the uncured polymer.

9. Oriented shaped objects of a halogen-containing polymer of a monoethylenic unsaturated compound having the halogen attached to intralinear carbon of reduced heat shrinkage tendency obtained by the process of claim 1 and having a softening point at least 15° C. higher than the untreated polymer and of at least 150° C.

10. Oriented filaments of a halogen-containing polymer of a monoethylenic unsaturated compound having the halogen attached to intralinear carbon of reduced heat shrinkage tendency obtained by the process of claim 2 and having a softening point at least 15° C. higher than the untreated polymer and of at least 150° C.

11. An oriented vinyl chloride polymer filament of reduced heat shrinkage tendency obtained by the process of claim 2 and having a softening point at least 15° C. higher than the untreated polymer and of at least 150° C.

12. An oriented shaped object of reduced heat shrinkage obtained by the process of claim 8 and having a softening point at least 15° C. higher than the untreated polymer and of at least 150° C.

KENNETH LESTER BERRY.
JULIAN WERNER HILL.